July 24, 1951     W. L. DIXON     2,561,614
AGRICULTURAL IMPLEMENT HITCH

Filed Oct. 22, 1945     2 Sheets-Sheet 1

WILLIAM L. DIXON
Inventor

By    *Paul Eaton*
Attorney

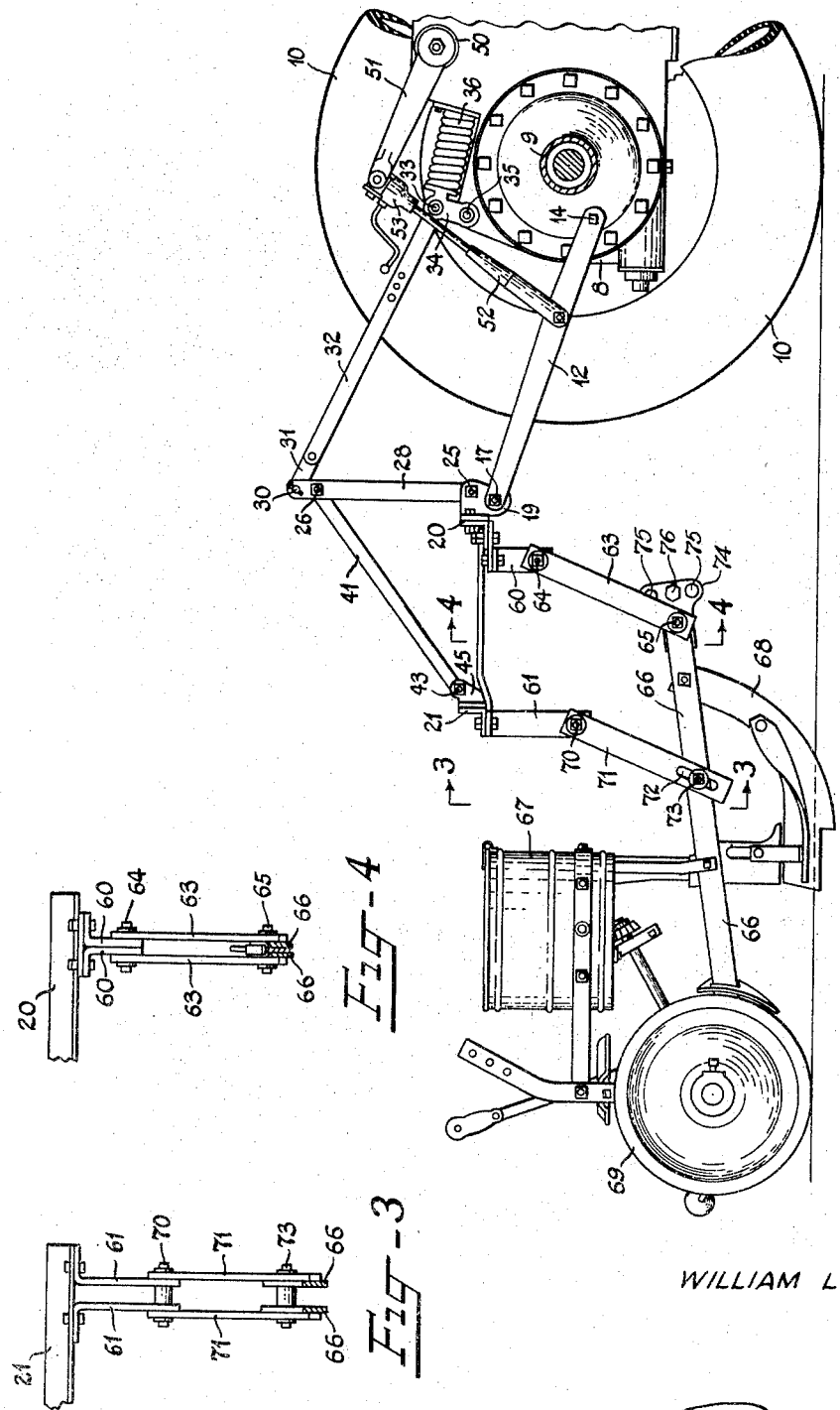

Patented July 24, 1951

2,561,614

UNITED STATES PATENT OFFICE 2,561,614

AGRICULTURAL IMPLEMENT HITCH

William L. Dixon, Charlotte, N. C.

Application October 22, 1945, Serial No. 623,702

3 Claims. (Cl. 97—47)

This invention relates to means for attaching a planter or distributing mechanism to a framework carried by a tractor so as to allow the planter up-and-down movement when it runs over an obstruction and also which permits the planters or distributors to be raised to inoperative position when not in use.

It is an object of this invention to provide means associated with a framework carried by a tractor for hitching a plurality of distributors, which framework is usually lifted upwardly or allowed to move downwardly by means of a conventional hydraulic or mechanical mechanism, and wherein the distributors can have backward-and-forward and up-and-down swinging movement freely with respect to the frame carried by the tractor.

It is another object of this invention to provide means associated with a frame carried by a tractor for mounting a plurality of planters or distributors whereby the planters or distributors may have individual backward-and-forward and up-and-down movement relative to the frame to compensate for irregularities in the ground surface.

Some of the objects of the invention having been stated, other objects will appear as the description proceeds when taken in connection with the accompanying drawings in which—

Figure 2 is a side elevation of Figure 1, looking from the lower side of Figure 1;

Figure 3 is a view mostly in elevation and partly in section, and taken along the line 3—3 in Figure 2;

Figure 4 is a view mostly in elevation and partly in section, and taken along the line 4—4 in Figure 2.

Figure 1:
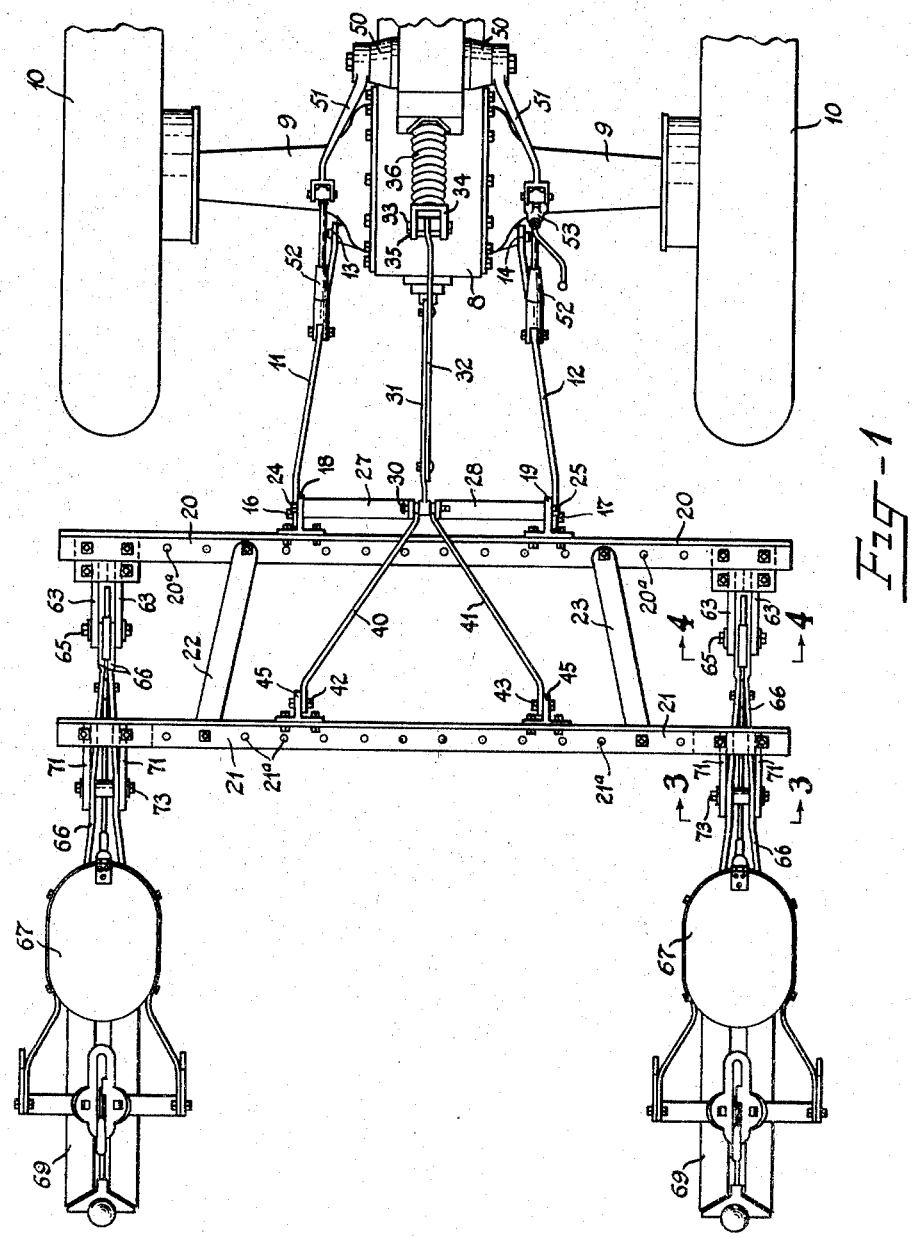
Figure 1 is a top plan view of the rear portion of a tractor and its associated framework, and showing a pair of planters attached to the framework by my improved means.

Referring more specifically to the drawings, the numeral 10 indicates the rear wheels of the tractor which has an axle housing 9 and a differential housing 8. A pair of links 11 and 12 are pivoted to the differential housing 8 as at 13 and 14. These links 11 and 12 extend rearwardly and are pivotally secured as at 16 and 17 to suitable brackets 18 and 19 which are fixed to a suitable angle iron 20. This angle iron 20 also has a companion rear angle iron 21, each being provided with a plurality of holes 20a and 21a therein for the mounting of various implements. The angle bars 20 and 21 are joined together by means of strap iron members 22 and 23.

Rigidly secured to the brackets 18 and 19 as at 24 and 25 is a pair of upwardly and inwardly projecting strap iron members 27 and 28 which at their upper ends are spaced a short distance from each other and are penetrated by a bolt 30 which bolt 30 penetrates the rear end of a link 31 which overlaps a link 32 whose front end is pivotally connected as at 33 to a pivoted link 34 which is pivoted as at 35 on the tractor and this has a compression spring arrangement 36 associated therewith for applying proper rearward pressure to the links 31 and 32 to apply downward pressure on the frame, but allowing it to move upwardly when undue pressure is applied to the same by the implements striking obstacles in the ground.

Also secured between members 27 and 28 by a bolt 26 is a pair of links 40 and 41 whose rear ends are secured by bolts 42 and 43 to suitable brackets 44 and 45 fixed on the rear angle bar 21.

A suitable hydraulic mechanism 50 has integral therewith levers or arms 51 to the rear end of which are pivotally connected links 52, one link having a suitable tilting mechanism 53 therein, and the lower ends of these links 52 are connected to the rearwardly extending bars 11 and 12, there being two levers 51 connected with the hydraulic mechanism and two links 52, but like references will apply to these parts, as they are identical.

The parts thus far described are conventional, and it is with this conventional mechanism that my improved mounting for an implement such as a distributor or planter is adapted to be associated.

In the drawings I have shown only two planters associated with this framework but it is evident that as many planters or other implements can be secured to the framework by my improved means as may be desired.

To the angle bar 20 there is secured a downwardly extending bracket 60 and to the rear angle bar 21 there is secured a downwardly extending bracket 61. These two brackets are in duplicate but like reference characters will apply to the same. To the lower end of the brackets 60 is pivotally secured a pair of links 63 by means of a bolt 64. The lower ends of the links 63 are pivotally secured as at 65 to the beam 66 of a planter or distributor having a conventional hopper 67, furrow opener 68, and covering wheel 69. A detailed description of the planter or distributor will not be given because it is of conventional make, as any type of planter or other implement may be secured by my improved mounting means. To the lower ends of brackets 61 there is secured as at 70 a pair of links 71 whose lower ends are slotted as at 72 and a bolt 73 penetrates the cultivator beams 66 and slidably penetrates the slots 72 and this bolt is usually not fully tightened so that up-and-down movement of the bolt 73 with the beams 66 can take place between the links 71 and the beams 66.

In order to limit relative movement between the front end of the beam 66 and the links 63 and 71 and also to permit the rear end of the implement frame to be raised off the ground, it will be observed that the end of the beam 66 of the implement frame to which the link 63 is pivoted also has a conventional clevis 74 secured thereto, said clevis having a plurality of bores 75 therein, and a suitable pin 76 may be inserted in any one of the bores 75 in the clevis, this pin will limit counter-clockwise movement of the beam 66 of the implement frame relative to the links 63 and 71 when the pin is engaged by the front edge of the links 63 and to thus limit full articulation between the beam 66 and the links 63 and 71 to permit the implement frame to be raised completely off the ground, if desired.

It is thus seen that when the hydraulic mechanism is operated to elevate the frame comprising angle irons 20 and 21 the links 63 and 71 will lift the cultivator, distributor, or other implement so mounted by my improved mechanism; whereas, with the hydraulic mechanism operated to lower the angle members 20 and 21 to the position, say as shown in Figure 2, then the implement is in operative position, and should a stone or stump or other object be encountered by the furrow opener 68 or the ground wheel 69, the cultivator can swing backwardly and upwardly to ride over this object without any damage to any of the mechanism.

Also, if there is a greater pull on the implement, then it naturally will swing backwardly farther than it would if there is little resistance offered to the travel of the implement by the ground over and through which it is traveling.

In the drawings and specification there has been set forth a preferred embodiment of the invention, and although specific terms are employed, they are used in a generic and descriptive sense only, and not for purposes of limitation, the scope of the invention being defined in the claims.

I claim:

1. Means for supporting an implement frame on a tractor having a rear axle housing and a pair of hydraulically operated arms and a pair of links having their front ends secured to the rear axle housing and extending rearwardly, said tractor also having a pair of lift links pivotally connected to the hydraulically operated arms and to said pair of links, a vertically movable frame comprising front and rear transverse horizontal bars and a pair of connecting bars having their ends secured to the front and rear horizontal bars, means pivotally connecting the rear ends of the first-named links to the front transverse bar, an upper link secured to the axle housing and extending rearwardly, a pair of upwardly converging links pivotally secured at their lower ends to the front transverse bar and having their upper ends pivotally secured to the rear end of the upper link, a pair of rearwardly and downwardly extending links pivotally secured at one of their ends to the upper ends of the upwardly converging links and having their rear ends pivotally secured to the rear transverse bar, fore and aft brackets mounted on the transverse horizontal bars and extending downwardly and fore and aft links pivotally connected at their upper ends to the fore and aft brackets and pivotally connected at their lower ends to two spaced points on the implement frame, the pivotal connection between the implement frame and the lower ends of the aft links being a pin and slot connection.

2. Means for supporting an implement frame on a tractor having a rear axle housing and a pair of hydraulically operated arms, said tractor also being provided with a pair of links having their front ends secured to the rear axle housing and extending rearwardly, a pair of lift links pivotally connected at their ends to the hydraulically operated arms and to said pair of links, a vertically movable frame comprising front and rear transverse horizontal bars and a pair of connecting bars having their ends secured to the front and rear transverse horizontal bars, means pivotally connecting the rear ends of the first-named links to the front transverse bar, an upper link pivotally secured to the axle housing and extending rearwardly, a pair of upwardly converging links pivotally secured at their lower ends to the front transverse bar and having their upper ends pivotally secured to the rear end of the upper link, a pair of rearwardly and downwardly extending links pivotally secured at one of their ends to the upper ends of the upwardly converging links and having their rear ends pivotally secured to the rear transverse bar, said horizontal transverse bars each having front and rear downwardly projecting brackets, each bracket having one end of a supporting link pivoted thereto, and the lower ends of said supporting links being pivotally connected to front and rear spaced points on the implement frame, the pivotal connection between the implement frame and the lower end of the rear supporting link including a pin and slot connection.

3. Means for supporting an implement frame on a tractor having a rear axle housing and a pair of hydraulically operated arms, said tractor also being provided with a pair of links having their front ends secured to the rear axle housing and extending rearwardly, a pair of lift links pivotally connected at their ends to the hydraulically operated arms and to said pair of links, a vertically movable frame comprising front and rear transverse horizontal bars and a pair of connecting bars having their ends secured to the front and rear transverse horizontal bars, means pivotally connecting the rear ends of the first-named links to the front transverse bar, an upper link pivotally secured to the axle housing and extending rearwardly, a pair of upwardly converging links pivotally secured at their lower ends to the front transverse bar and having their upper ends pivotally secured to the rear end of the upper link, a pair of rearwardly and downwardly extending links pivotally secured at one of their ends to the upper ends of the upwardly converging links and having their rear ends pivotally secured to the rear transverse bar, said horizontal transverse bars each having front and rear downwardly projecting brackets, each bracket having one end of a supporting link pivoted thereto, and the lower ends of said supporting links being pivotally connected to front and rear spaced points on the implement frame, the pivotal connection between the implement frame and the lower end of the rear supporting link including a pin and slot connection and means for limiting swinging movement between the front end of the implement frame and the forward supporting link.

WILLIAM L. DIXON.

REFERENCES CITED

The following references are of record in the file of this patent:

UNITED STATES PATENTS

| Number | Name | Date |
| --- | --- | --- |
| 844,912 | Bennett | Feb. 19, 1907 |
| 974,916 | Raez | Nov. 8, 1910 |
| 1,940,992 | Beall | Dec. 26, 1933 |
| 2,174,808 | Tuft | Oct. 3, 1939 |
| 2,318,205 | Drennan | May 4, 1943 |
| 2,365,201 | McKahin | Dec. 19, 1944 |
| 2,371,037 | Englund | Mar. 6, 1945 |